United States Patent Office 3,087,943
Patented Apr. 30, 1963

3,087,943
3,5-CYCLO-10-HYDROXY-19-NORANDROSTAN-17-ONES AND INTERMEDIATE
William F. Johns, Morton Grove, Ill., assignor to G. D. Searle & Co., Chicago, Ill., a corporation of Delaware
No Drawing. Filed Jan. 2, 1962, Ser. No. 163,847
3 Claims. (Cl. 260—397.4)

This invention relates to 3,5-cyclo-10-hydroxy-19-norandrostan-17-ones and intermediates thereto. More particularly, this invention relates to new and useful chemical compounds of the formulas

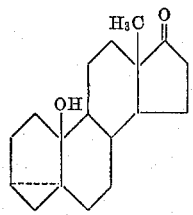 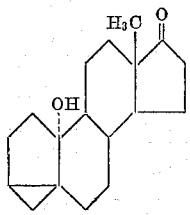

and especially the intermediate thereto of the formula

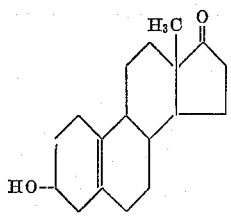

The compounds of this invention are useful because of their valuable pharmacological properties. Thus, for example, they stimulate the central nervous system, inhibit pepsin activity, and retard the incorporation of mevalonic acid during biosynthesis of cholesterol. The intermediate 3α-hydroxy compound referred to hereinbefore is not only an important link in the synthetic chain which affords the 3,5-cyclo products, but is itself an anticholesterologenic agent adapted to favorably affect the concentration of blood lipids.

Preparation of the instant compounds proceeds by heating a 3-tosyl ester of the formula

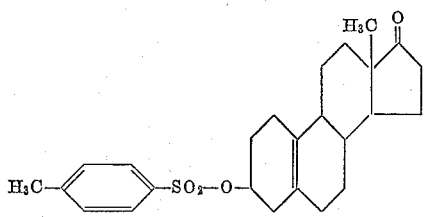

in aqueous acetonic potassium acetate.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are referred to the D line of sodium.

Example 1

A. *3β - tolylsulfonyloxy - 19 - norandrost-5(10)-en-17-one.*—To a solution of approximately 17 parts of 3β-hydrozy-19-norandrost-5(10)-en-17-one (U.S. 2,944,067) in 250 parts of pyridine at 20° is added 14 parts of p-tolylsulfonyl chloride. The resultant mixture is allowed to stand at room temperatures for 20 hours, whereupon excess aqueous potassium bicarbonate is introduced; and the mixture thus obtained is extracted with benzene. The benzene extract is consecutively washed with water, excess aqueous hydrochloric acid, water, and aqueous potassium bicarbonate. It is then dried over magnesium sulfate and freed of solvent by vacuum distillation. The residue, crystallized from methanol and then from a mixture of ether and petroleum ether, affords 3β-tolylsulfonyloxy-19-norandrost-5(10)-en-17-one melting at approximately 133–134° and further characterized by a specific rotation of +238°.

B. *3α,5α - cyclo - 10β - hydroxy - 19 - norandrostan-17-one.*—A mixture of 37 parts of 3β-tolylsulfonyloxy-19-norandrost-5(10)-en-17-one dissolved in 1120 parts of acetone and 144 parts of potassium acetate dissolved in 1000 parts of water is maintained with agitation at 25° for 6 hours, then heated at the boiling point under reflux with agitation for 20 hours. The acetone is thereupon distilled off, and the residue is extracted with benzene. The benzene extract is stripped of solvent by distillation; and the residue is chromatographed on silica gel, using benzene and ethyl acetate in increasing amounts of the latter as developing solvent. From eluates comprising 5% ethyl acetate in benzene, on distillation of solvent, two products are obtained. The less polar product is 3α,5α-cyclo-10β-hydroxy-19-norandrostan-17-one which, recrystallized from a mixture of acetone and petroleum ether, affords 3α,5α-cyclo-10β-hydroxy-19-norandrostan-17-one melting at 193-195° and further characterized by a specific rotation of +115°. The product has the formula

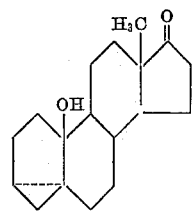

Example 2

A. *3α - hydroxy-19-norandrost-5(10)-en-17-one.*—The more polar of the two products obtained by chromatography of the reaction product described in the foregoing Example 1B is 3α-hydroxy-19-norandrost-5(10)-en-17-one melting at 137–139° and having a specific rotation of +206°.

B. *3α - tolylsulfonyloxy - 19 - norandrost-5(10)-en-17-one.*—To a solution of 8 parts of 3α-hydroxy-19-norandrost-5(10)-en-17-one in 300 parts of pyridine at 5° is added 10 parts of p-tolylsulfonyl chloride. The resultant solution is allowed to stand at room temperatures for 20 hours, then diluted with excess aqueous potassium biscarbonate and thereupon extracted with benzene. The benzene extract is consecutively washed with water, excess aqueous hydrochloric acid, water, and aqueous potassium bicarbonate, following which it is dried over anhydrous magnesium sulfate and stripped of solvent by vacuum distillation. The residue is chromatographed on silica gel, using benzene and ethyl acetate in increasing amounts of the latter as developing solvent. From an eluate comprising 2% ethyl acetate in benzene, on distillation of solvent, is obtained 3α-tolylsulfonyloxy-19-norandrost-5(10)-en-17-one which, recrystallized from a mixture of acetone and petroleum ether, melts at approximately 138–139° and is further characterized by a specific rotation of +148°.

C. *3β,5β - cyclo - 10α - hydroxy - 19 - norandrostan-17-one.*—A solution of 2 parts of 3α-tolylsulfonyloxy-19-norandrost-5(10)-en-17-one in 80 parts of acetone and a solution of 10 parts of potassium acetate in 80 parts of water are mixed at room temperature and maintained thereat with agitation for 6 hours, then heated at the boiling point under reflux with agitation for an additional 24 hours. The resultant solution is cooled and extracted with benzene. The benzene extract is stripped of solvent by distillation; and the residue is chromatographed on silica gel, using benzene and ethyl acetate in increasing amounts of the latter as developing solvent. From an eluate comprising 10% ethyl acetate in benzene, on distillation of solvent and recrystallization of the residue from petroleum ether, is obtained 3β,5β-cyclo-10α hydroxy-19-norandrostan-17-one melting at 173–176° and with a specific rotation of +136°. The product has the formula

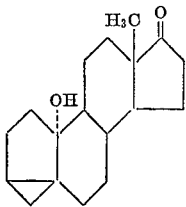

What is claimed is:
1. A compound selected from the group consisting of a compound having the formula

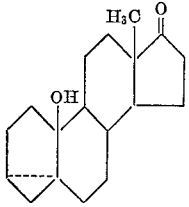

and a compound having the formula

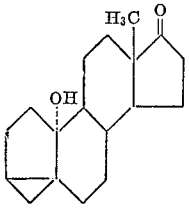

2. 3α,5α-cyclo-10β-hydroxy-19-norandrostan-17-one.
3. 3β,5β-cyclo-10α-hydroxy-19-norandrostan-17-one.

References Cited in the file of this patent
UNITED STATES PATENTS
2,944,068    Johns _____ July 5, 1960